United States Patent [19]

Laviano et al.

[11] 4,379,411

[45] Apr. 12, 1983

[54] FLOW TRANSDUCER

[75] Inventors: Edmund G. Laviano, Patchogue; Gerald S. Lefebvre, Holtsville, both of N.Y.

[73] Assignee: Interactive Design Inc., Lake Ronkonkoma, N.Y.

[21] Appl. No.: 234,304

[22] Filed: Feb. 13, 1981

[51] Int. Cl.³ ............................................. G01F 1/075
[52] U.S. Cl. ................................ 73/861.78; 73/861.87
[58] Field of Search ............ 73/861.77, 861.78, 861.79, 73/861.89, 861.92

[56] References Cited

U.S. PATENT DOCUMENTS

| | | | |
|---|---|---|---|
| 3,036,460 | 5/1962 | White et al. | 73/861.78 X |
| 3,162,042 | 12/1964 | Hart | 73/861.78 X |
| 3,531,988 | 10/1970 | Casani et al. | 73/187 |
| 3,771,362 | 11/1973 | Roberts | 73/861.77 |
| 4,114,440 | 9/1978 | Stapler | 73/861.92 |

FOREIGN PATENT DOCUMENTS 1055609 1/1967 United Kingdom.

Primary Examiner—Herbert Goldstein
Attorney, Agent, or Firm—Goodman & Teitelbaum

[57] ABSTRACT

A flow transducer for measuring the flow of a fluid, the transducer including a housing having two spaced apart depending legs with a shaft rotatably mounted between the legs, and a rotor secured on the shaft for rotation by the flow of fluid thereacross. In one of the legs is provided a chamber which houses a magnetic device also secured on the shaft for rotation with the rotor. The magnetic device produces a change in a magnetic characteristic as a function of the rotation of the rotor. A suitable sensor is contained in the housing adjacent to the magnetic device, and produces an electrical output responsive to the change in the magnetic characteristic.

13 Claims, 6 Drawing Figures

U.S. Patent   Apr. 12, 1983   4,379,411
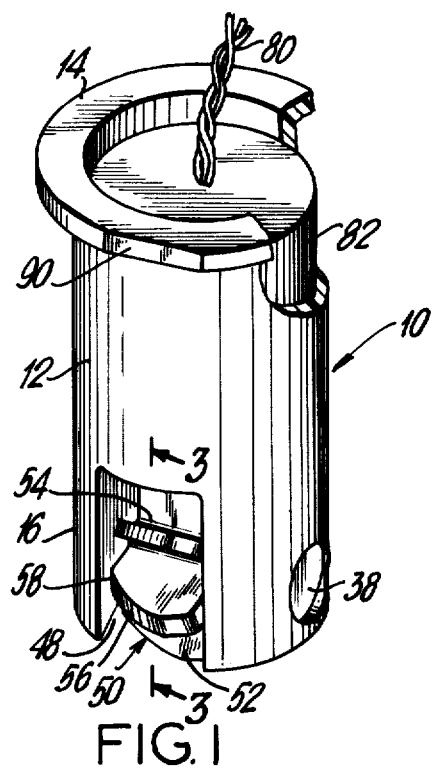
FIG.1
FIG.3
FIG.5
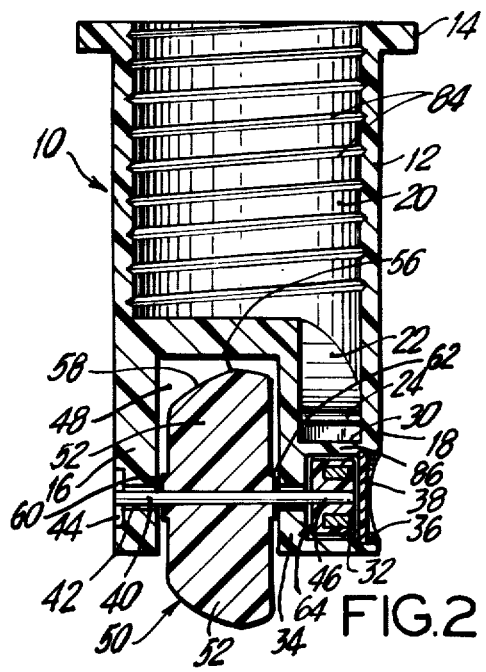
FIG.2
FIG.4
FIG.6

FLOW TRANSDUCER

BACKGROUND OF THE INVENTION

This invention relates to a flow transducer, and more particularly to a device which can sense the flow of fluid and produce an electrical signal responsive thereto.

Flow transducers are typically utilized in various fluid systems to determine the rate of flow of the fluid. For example, in a system having fluid flowing within tubes or pipes, a flow transducer may be typically inserted into the flow stream so that the rate of flow can be continuously monitored. The output from the transducer is typically sent to a display device, which may include a meter or digital display, so that the actual rate of flow can be monitored or permanently recorded.

Frequently the flow transducer includes a rotating element which senses the flow of the fluid and produces a change in a characteristic which can be converted into an electrical signal, which is then measured. The electrical signal is then a function of the flow of the fluid.

Many problems have existed with prior art flow transducers because of their individual construction. For example, in many cases a rotor or other rotating device is utilized to detect the flow of the fluid and the rotor is supported by a housing. However, the spacing between the housing and the rotor is kept small in order to minimize the gap between the rotar's magnet and the housing's magnetic pickup. Such small spacing can frequently cause stalling of the rotor as the fluid, or impurities contained in the fluid, may jam the space causing the rotors to slow, stop or in many cases, even cause damage to the rotor.

Additionally, the various prior art transducers frequently utilize magnetic sensing whereby magnets are placed into the rotor in order to cause a change in a magnetic characteristic which can then be sensed. By placing the magnets directly in the rotor, the construction of the rotor becomes complex since it must be formed in sections and then assembled together with the magnets. Furthermore, it is difficult to vary the number of magnets since then the rotor would have to be redesigned to accommodate the different number of magnets. When placing the magnets in the rotor, the magnets may come in direct contact with the fluid. This can often damage the magnets, contaminate the fluid, and in some cases limit the use of the flow transducer. Frequently the magnet, when situated in the rotor, will accumulate ferrous particles on the exterior of the rotor and cause interference with the housing. Additionally, placing the magnets directly into the rotor increases the size and weight of the rotor, which thereby requires a heavier shaft to support the rotor. As a result, a greater flow of fluid is required to cause the rotor to move. Current flow sensors which utilize a magnet and sense a magnetic characteristic, do so through an inductance pickup utilizing a magnetic circuit including a magnetic core. This results in a magnetic stiction between the rotor and the housing through magnetic attraction between the pickup core and the rotor magnet. Therefore, many transducers cannot sense low flow rates and have inherent limitations to their use.

SUMMARY OF THE INVENTION

It is accordingly an object of the present invention to provide a flow transducer which avoids the aforementioned problems of prior art devices.

Another object of the present invention is to provide a flow transducer which includes a rotor which is separated from a trigger device.

Still another object of the present invention is to provide a flow transducer which permits the rotor to be constructed of a unitary piece and which insulates a magnetic rotating member from the rotor.

Yet a further object of the present invention is to provide a flow transducer which can utilize a lightweight rotor on a lightweight shaft, whereby low flow rates can be detected.

Another object of the present invention is to provide a flow transducer which utilizes a change in a magnetic characteristic to detect the flow, and whereby such change in magnetic characteristic can be sensed by a variety of electrical sensing devices. As opposed to the prior art, the sensing scheme of the present invention eliminates the magnetic stiction.

Still another object of the present invention is to provide a flow transducer which provides a large gap between the rotor and the rotor support housing in order to avoid the likelihood of stalling, jamming, or rotor damage.

Another object of the present invention is to provide a flow transducer which includes a magnetic rotating drum which is separated from a rotor, and wherein the number of magnets in the drum can be selectively inserted, and which also provides isolation of the magnets from the flow.

A further object of the present invention is to provide a flow transducer having reduced vibration, greater structural security, reduced centrifugal forces, and higher accuracy than prior art devices.

Yet another object of the present invention is to provide a flow transducer which allows reduced material, easier assembly, superior performance, and simplified maintenance as compared with prior art devices.

Briefly, in accordance with the present invention, there is provided a flow transducer for measuring the flow of a fluid. The flow transducer includes a housing having two spaced apart depending legs. A shaft is rotatably mounted between the legs. A rotor is secured on the shaft and is freely rotatable between the legs by means of the flow of fluid thereacross. A chamber is formed in one of the legs with an end portion of the shaft passing into the chamber. A magnetic device is secured on the shaft end portion, and is retained within the chamber separate from the rotor for producing a change in a magnetic characteristic as a function of the rotation of the rotor. A sensor, contained in the housing adjacent to the magnetic device, produces an electrical output in response to the change in the magnetic characteristic.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a perspective view, partially broken away, of the flow transducer in accordance with the present invention;

FIG. 2 is a vertical sectional view taken through the center of the flow transducer shown in FIG. 1;

FIG. 3 is an enlarged fragmented sectional view taken along lines 3—3 of FIG. 1;

FIG. 4 is an enlarged fragmented sectional view of one of the depending legs housing the magnetic device shown in FIG. 2;

FIG. 5 is an end view of the magnetic device; and

FIG. 6 is an enlarged fragmented sectional view taken along line 6—6 of FIG. 4.

In the various figures of the drawing, like reference characters designate like parts.

DETAILED DESCRIPTION OF THE PREFERRED EMBODIMENT

Referring now to the drawings, the flow transducer of the present invention is shown in FIG. 1, generally at 10, and includes a cylindrical hollow housing 12 having an outwardly directed peripheral flange 14 at its upper end, and spaced apart depending legs 16, 18 at its lower end. Internally of the housing, there is formed a chamber 20, shown in FIG. 2, which extends partially downward into the depending leg 18 to form a lower smaller chamber section 22 of the chamber 20. A pair of ribs 24 is formed transversely across the chamber section 22, so that corresponding ribs are formed on opposing sides of the section. It should be noted, that the depending leg 18 is larger than the depending leg 16 because the leg 18 contains chamber section 22. However, such differential sizing is optional. The chamber section 22 has opposing side walls 26, 28 which are downwardly tapered to form a narrow seat portion 30, shown in FIG. 6, below the ribs 24 in which is positioned a sensing device 31, as will hereinafter be explained.

Within the lower portion of the depending leg 18, there is formed a further separate chamber, shown as the circular recess 32. It should be noted, that recess 32 does not extend entirely transversely through the leg 18. On its inner side, the solid inner wall 34 closes one side of the recess. Access to the recess 32 is through the slightly larger opening 36 formed through the outer peripheral wall of the leg 18. The recess 32 is closed by means of a circular cover plate 38 inserted in a force fit into the opening 36, wherein the cover plate 38 may be snapped or cemented in place.

A shaft 40 extends into each of the legs 16, 18, as shown in FIG. 2. One end 42 of the shaft 40 is shown rotatably disposed in the solid leg 16 and is rotatably held in place by means of a bushing 44, the bushing 44 having an opening to receive the shaft end 42. The bushing 44 is received in a recess formed in the leg 16, wherein the bushing is formed from a wear resistant material which is harder than the material of the leg 16. The other end of the shaft 40 is rotatably disposed in the leg 18 and extends at least partway into the recess 32 formed in the leg 18, as shown by the shaft end portion 46. The shaft 40 extends across the space 48 between the legs 16, 18.

Mounted onto the shaft 40, in a force fit relationship, is a rotor 50 formed as a paddle wheel having peripheral blades 52 extending from a central hub section 54 through which the shaft 40 passes, as shown in FIGS. 1-3. The blades 52 are formed with their distal edge 56 tapered toward one side, as shown at 58, the function of which will be set forth below. Small bearings 60, 62 are integrally formed with the hub 54 to appropriately space the paddle wheel within the spacing 48, whereby the rotor 50 and the shaft 40 rotate together as a unit.

Positioned within the recess 32, as shown in FIG. 4, is a trigger device or drum 64 having a central aperture 66 through which the drum is mounted, in a force fit relationship, onto the shaft end portion 46 extending into the recess 32, whereby the shaft 40 and the drum 64 rotate together as a unit together with the rotor 50. Axially extending chambers or recesses 68, 70 extend from one end of the drum 66 partially into the drum. Held tightly in a force fit relationship within these recesses 68, 70 are magnetic pole pieces 72, 74, as shown in FIGS. 4 and 5. The polarity of the pole pieces 72, 74 can be adjusted to be opposing each other, or to be identical to each other, depending upon the type of sensor that will be utilized, as will hereinafter be explained.

In assembling the device, the shaft 40 is first inserted through one of the legs 16, 18. The paddle wheel rotor 50 is then positioned between the legs and mounted onto the shaft 40, and the shaft 40 is then inserted into the other one of the legs 16, 18 making sure that the paddle wheel is freely rotatable between the legs. The magnetic device or drum 64 is mounted onto the shaft end portion 46 within the recess 32 to position the drum 64 within the recess 32. The cover plate 38 is then sealed in place in the opening 36 to close off the recess 32, and the bushing 44 is then inserted on the shaft end 42 and force fit or cemented into the recess provided in the leg 16 therefor. The magnetic drum 64 will then rotate together with the movement of the paddle wheel or rotor 50.

The electrical sensor 31, which is well known in the art and commercially available, is then inserted into the chamber section 22 in the leg 18 and pushed down so that it is accommodated in the seat portion 30. The side walls 26, 28 are tapered towards the seat portion 30 to facilitate insertion of the sensor 31. Preferably, the top portion of the sensor has a semi-cylindrical shape, and the lower side walls are tapered inwardly toward the bottom thereof. The sensor is held in place in the seat portion 30 by means of the opposing ribs 24 on either side of the sensor which provide a snap fit for the sensor, wherein the upper portions of the sensor side walls snap below the ribs 24, as shown in FIG. 6 and indicated in FIG. 4.

Upwardly extending from the sensor 31 are electrical wires 80, from which an electrical signal can be obtained from the sensor. The electrical wires extend upwardly in the chamber section 22 and through the chamber 20 in the housing 12. Epoxy, or other type of potting material 82, is then inserted into the chamber 20 and chamber section 22. Spiral grooves or threads 84 are provided in the housing 12 to facilitate retention of the potting material therein.

It should be noted, that the sensor 31 is spaced from the magnetic drum 64 by means of the insulating wall 86 provided in the leg 18 between the recess 32 and the seat portion 30, so that the magnetic device or drum can trigger the sensor.

The flow meter can be inserted into a pipe, conduit, tube, tank or the like, and as the fluid passes between the legs 16, 18 causing the rotor 50 to rotate, it will also cause the shaft 40 and the magnetic drum 64 to simultaneously rotate therewith, thereby causing a change in the magnetic field. The sensor 31 will detect such change and generate an electrical signal as a function of such change. The electrical signal can be displayed, typically on a digital display, whereby the instantaneous flow rate can be determined. The change of magnetic characteristic can be measured by a variety of sensors. For example, any of the following well known in the art sensors can be utilized, including a Hall effect sensor, a Wygand wire, a variable reluctance coil, an AC inductor, as well as other types of sensing devices, all of which are sensitive to change in magnetic characteristics.

In order to properly position the flow meter while only viewing it from the top, a flat edge 90, is formed on one side of the upper flange 14, as shown in FIG. 1. The flat edge 90 is shown to be parallel to the shaft 40 and in alignment with the space 48 between the legs 16, 18 in order to indicate the orthogonal direction to the rotation of the rotor 50. However, it is arbitrary as to where the flat section is provided as long as its relationship to the rotor 50 is known. It should be understood that other means of identifying the proper position of the flow meter can also be provided.

It should be appreciated that with the present embodiment, the magnets 72, 74 are located in an internal drum which rotates and is coupled to the paddle wheel rotor through a common shaft. In this manner, the magnetic device is separated from the actual rotor and does not have to be embedded into the rotor itself. As a result, the number of magnets that can be utilized can be selected and varied by simply placing them in the magnetic device without effecting the rotor. The number of magnets utilized will vary the number of signals generated per revolution. Accordingly, based upon the particular utilization, it may be desired to modify the number of magnets, to change their spacing, or the type and size of the magnets. All this can be simply modified without changing the paddle wheel design.

Since the magnets are not housed in the paddle rotor itself, a very substantial reduction in the mass of the rotor can be achieved. Also, the design flexibility as to the number, size and shape of the rotor blades can be achieved independently of the design of the magnets. These improvements permit a reduction in the centrifugal force, yielding less vibration and greater structural security. As a result, it raises the operational limit of the speed of the rotor. This allows measurement of higher velocity flows.

Furthermore, since the paddle can be separately designed, it permits a reduced paddle mass due to the use of thin blades and also to the use of tapered blade edges. This saves considerably in material costs. Also, since the paddle rotor does not house any magnets, the rotor can be molded as a single piece, thereby reducing assembly time and providing superior strength.

Utilization of thin paddle blades, and/or the taper 58 of the distal blade edge 56, offers less vibration due to their low mass, and therefore, requires a smaller diameter shaft thereby reducing friction. This is important in reducing the flow velocity required to start the paddle rotation. It also permits the measurement of lower velocity flows.

The use of the lighter paddles permits a lighter shaft, which means a smaller diameter, thereby providing a cost saving in material.

An additional benefit is that the rotor is spaced from the housing in which it is contained. Specifically, it spans a distance between the depending legs. This large gap, which is also due in part to the taper 58 of the distal blade edge 56, reduces the likelihood of paddle stalling. It also reduces the likelihood of foreign debris, which may be carried by the flow, from jamming the paddle rotor to the housing which will prohibit the sensor to perform, and also may cause damage to the rotor.

Since the magnets are isolated from the flow of the fluid, it prevents magnetic attraction, accumulation, and potential jamming of the paddle blades with the housing, as is the case with other prior art devices.

As a result of the present design, superior hydrodynamic performance is obtained which reduces the stall margin. Close proximity of the magnets to the protected area where the sensor is mounted, also allows the use of a variety of sensors.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A flow transducer for measuring the flow of a fluid, said transducer comprising:
   a housing having two spaced apart depending legs;
   a shaft rotatably mounted between said legs;
   a rotor secured on said shaft for rotation therewith, and being freely rotatable between said legs by means of the flow of fluid thereacross;
   a chamber provided in one of said legs with a portion of said shaft passing into said chamber;
   trigger means secured on said shaft portion for rotation therewith, and being retained in said chamber for producing a change in a measurable characteristic as a function of the rotation of said rotor;
   sensor means contained in said housing adjacent to said trigger means, and producing an electrical output responsive to said change in the measurable characteristic;
   said rotor including a paddle wheel having a plurality of thin blades radially extending from a central hub; and
   a distal end of each blade being angularly shaped curving toward one side edge of said blade.

2. A flow transducer as in claim 1, wherein said housing includes a seat portion for accommodating said sensor means, and rib means for retaining said sensor means in said seat portion.

3. A flow transducer for measuring the flow of a fluid, said transducer comprising:
   a housing having two spaced apart depending legs;
   a shaft rotatably mounted between said legs;
   a rotor secured on said shaft for rotation therewith, and being freely rotatable between said legs by means of the flow of fluid thereacross;
   a chamber provided in one of said legs with a portion of said shaft passing into said chamber;
   trigger means secured on said shaft portion for rotation therewith, and being retained in said chamber for producing a change in a measurable characteristic as a function of the rotation of said rotor;
   sensor means contained in said housing adjacent to said trigger means, and producing an electrical output responsive to said change in the measurable characteristic;
   said housing including a seat portion for accommodating said sensor means; and
   rib means for retaining said sensor means in said seat portion.

4. A flow transducer as in claims 1 or 3, wherein said trigger means includes magnetic means which produce said change in a magnetic characteristic.

5. A flow transducer as in claim 4, wherein said magnetic means includes a cylindrical member having a magnetic pole piece adjacent the periphery of said cylindrical member.

6. A flow transducer as in claim 5, and further including an axially directed recess extending into said cylindrical member from one end thereof, for housing said magnetic pole piece.

7. A flow transducer as in claim 4, wherein said housing is fabricated from an insulating material which serves to isolate said magnetic means from said rotor.

8. A flow transducer as in claim 4, wherein said chamber is closed to thereby isolate said magnetic means from the flow of fluid.

9. A flow transducer as in claim 3, wherein said rotor includes a paddle wheel having a plurality of thin blades radially extending from a central hub.

10. A flow transducer as in claim 9, wherein a distal end of each blade is angularly shaped curving toward one side edge of said blade.

11. A flow transducer as in claims 1 or 9, wherein said paddle wheel is a one piece unitary member.

12. A flow transducer as in claims 1 or 3, wherein said sensor means is selected from the group consisting of a Hall effect sensor, a Wygand wire, a variable reluctance coil, and an AC inductor.

13. A flow transducer as in claims 1 or 3, further including directional means provided on said housing for indicating the orthogonal direction to rotation of the rotor.

* * * * *